US009118442B2

(12) United States Patent
Chang et al.

(10) Patent No.: US 9,118,442 B2
(45) Date of Patent: Aug. 25, 2015

(54) METHOD AND SYSTEM FOR CONTINUOUS PACKET CONNECTIVITY

(75) Inventors: Li Fung Chang, Holmdel, NJ (US); Khoi Ly, San Diego, CA (US); Bin Liu, San Diego, CA (US); Simon Baker, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1265 days.

(21) Appl. No.: 12/577,080

(22) Filed: Oct. 9, 2009

(65) Prior Publication Data

US 2011/0085493 A1    Apr. 14, 2011

(51) Int. Cl.
| | |
|---|---|
| *H04L 1/00* | (2006.01) |
| *H04L 1/18* | (2006.01) |
| *H04W 28/04* | (2009.01) |
| *H04W 28/14* | (2009.01) |
| *H04W 88/06* | (2009.01) |

(52) U.S. Cl.
CPC ............ *H04L 1/0038* (2013.01); *H04L 1/1835* (2013.01); *H04L 1/0046* (2013.01); *H04L 1/0061* (2013.01); *H04W 28/04* (2013.01); *H04W 28/14* (2013.01); *H04W 88/06* (2013.01)

(58) Field of Classification Search
USPC ................ 370/328, 329, 331, 335, 338, 342; 455/422.1, 436–438, 450
See application file for complete search history.

(56) References Cited

U.S. PATENT DOCUMENTS

| | | | | |
|---|---|---|---|---|
| 7,200,405 | B2* | 4/2007 | Rudolf et al. ................. | 370/329 |
| 7,945,258 | B2* | 5/2011 | Sollenberger et al. ........ | 370/328 |
| 8,259,674 | B2* | 9/2012 | Shimobayashi .............. | 370/331 |
| 8,792,456 | B2* | 7/2014 | Yano et al. .................... | 370/335 |
| 2003/0210669 | A1* | 11/2003 | Vayanos et al. ............... | 370/335 |
| 2004/0125766 | A1* | 7/2004 | Takano et al. ................. | 370/328 |
| 2005/0003782 | A1* | 1/2005 | Wintzell ..................... | 455/226.3 |
| 2005/0063344 | A1* | 3/2005 | Winzell ........................ | 370/335 |
| 2006/0013161 | A1* | 1/2006 | Suzuki .......................... | 370/328 |
| 2006/0221923 | A1* | 10/2006 | Usuda et al. .................. | 370/338 |
| 2006/0240831 | A1* | 10/2006 | Toskala et al. ................ | 455/436 |
| 2007/0189248 | A1* | 8/2007 | Chang et al. .................. | 370/338 |
| 2007/0280158 | A1* | 12/2007 | Qiu et al. ...................... | 370/329 |
| 2008/0019434 | A1* | 1/2008 | Kim et al. ..................... | 375/346 |
| 2008/0123567 | A1* | 5/2008 | Suzuki .......................... | 370/277 |
| 2008/0144508 | A1* | 6/2008 | Tseng ........................... | 370/235 |

(Continued)

FOREIGN PATENT DOCUMENTS

EP              1976309  A1 *  10/2008

*Primary Examiner* — Jenee Williams
(74) *Attorney, Agent, or Firm* — Sterne, Kessler, Goldstein & Fox P.L.L.C.

(57) ABSTRACT

A UE receives HSDPA traffic comprising legacy HSDPA traffic and HS-SCCH-less HSDPA traffic. The UE concurrently processes the received legacy HSDPA traffic and the received HS-SCCH-less HSDPA traffic. The received HSDPA traffic is concurrently buffered into a first storage and a second storage to support simultaneously receiving legacy HSDPA traffic and HS-SCCH-less HSDPA traffic. A HARQ process is performed on the buffered HSDPA traffic in the first storage or the second storage according to a corresponding HS-SCCH CRC test. The resulting HARQ processed HSDPA traffic is Turbo decoded. Turbo decoding on the previously HARQ processed HSDPA traffic is performed simultaneously with HARQ processing on the buffered HSDPA traffic in the first storage or the second storage. The buffered HS-SCCH-less HSDPA traffic is processed via HARQ processing and Turbo decoding for each of the four pre-determined transport formats.

20 Claims, 10 Drawing Sheets

(56) References Cited

U.S. PATENT DOCUMENTS

2009/0003301 A1* 1/2009 Reial et al. .................. 370/342
2009/0003377 A1* 1/2009 Andersson et al. ........... 370/464
2009/0024896 A1* 1/2009 Tseng ........................... 714/751
2009/0036117 A1* 2/2009 Sollenberger et al. ........ 455/424
2010/0023835 A1* 1/2010 Tseng ........................... 714/751

* cited by examiner

METHOD AND SYSTEM FOR CONTINUOUS PACKET CONNECTIVITY

CROSS-REFERENCE TO RELATED APPLICATIONS/INCORPORATION BY REFERENCE

This application makes reference to:
U.S. patent application Ser. No. 12/582,771 filed on even date herewith;
U.S. patent application Ser. No. 12/604,978 filed on even date herewith;
U.S. Patent Application Ser. No. 61/242,524 filed on Sep. 15, 2009;
U.S. patent application Ser. No. 12/573,803 filed on Oct. 5, 2009;
U.S. patent application Ser. No. 12/604,976 filed on even date herewith;
U.S. Patent Application Ser. No. 61/246,797 filed on Sep. 29, 2009;
U.S. patent application Ser. No. 12/575,879 filed on even date herewith;
U.S. patent application Ser. No. 12/615,237 filed on even date herewith;
U.S. patent application Ser. No. 61/288,008 filed on even date herewith;
U.S. Patent Application Ser. No. 61/242,554 filed on Sep. 15, 2009;
U.S. patent application Ser. No. 12/612,272 filed on even date herewith;
U.S. patent application Ser. No. 12/575,840 filed on even date herewith;
U.S. patent application Ser. No. 12/605,000 filed on even date herewith;
U.S. patent application Ser. No. 12/543,283 filed on Aug. 18, 2009;
U.S. patent application Ser. No. 12/570,736 filed on even date herewith; and
U.S. patent application Ser. No. 12/603,304 filed on even date herewith.

Each of the above stated applications is hereby incorporated herein by reference in its entirety.

FIELD OF THE INVENTION

Certain embodiments of the invention relate to signal processing for communication systems. More specifically, certain embodiments of the invention relate to a method and system for continuous packet connectivity.

BACKGROUND OF THE INVENTION

Wideband Code Division Multiple Access (WCDMA) mobile wireless systems have enjoyed widespread uptake of high-quality circuit-switched applications like voice and video telephony. However, they have yet to deliver to the vision of a truly ubiquitous mobile data primarily due to the absence of an efficient high-speed-packet-switched data transmission platform. Data services like mobile Internet access require asymmetric packet switched networks to best utilize the available spectrum in a multiuser environment.

High-speed downlink packet access (HSDPA) is a packet-based data service in W-CDMA downlink with theoretical peak data rates of up to 14.4 Mbps or higher by utilizing adaptive modulation and coding (AMC), hybrid ARQ (HARQ), and fast MAC scheduling. HSDPA offers high-speed downlink shared channel (HS-DSCH) that carries control information of the associated HSDPA data channel. The HS-DSCH is a mechanism to enable sharing of the HSDPA channel among multiple users. Using these channels, HSDPA systems may provide excellent packet-switched data services to several users simultaneously and efficiently.

To implement the HSDPA feature, three new physical channels, High Speed physical Downlink-Shared Channel (HS-PDSCH), High-speed Shared Control Channel (HS-SCCH), and Uplink High-Speed Dedicated Physical Control Channel (HS-DPCCH), are introduced in the physical layer specifications to enable HS-DSCH transmission. The HS-SCCH is a downlink control channel that is utilized to inform mobile devices, also called user equipment, when HSDPA data carried over the HS-PDSCH is scheduled for them, and how they may receive and decode the HSDPA data. Up to four HS-SCCH may be observed for each mobile device. The mobile devices needs to decode the HS-SCCH that carries control information such as modulation scheme, number of physical channels, transport block format, and HARQ information, for HS-PDSCH before it gets decoded on the HS-PDSCH. The HS-DPCCH is an uplink control channel used by the mobile devices to report the downlink channel quality and/or request packet retransmissions to the network.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for continuous packet connectivity, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for continuous packet connectivity. In various embodiments of the invention, a UE is operable to receive HSDPA traffic (HSDPA data packets) comprising legacy HSDPA traffic and HS-SCCH-less HSDPA traffic. The UE is operable to concurrently process the received legacy HSDPA traffic and the received HS-SCCH-less HSDPA traffic. The UE is operable to concurrently buffer the received HSDPA traffic into a first storage and a second storage, respectively, so as to support blindly receiving legacy HSDPA traffic and HS-SCCH-less HSDPA traffic. The UE may be operable to process the buffered HSDPA traffic in the first storage or the second storage. A HARQ process may be performed on the buffered HSDPA traffic in the first storage or on the buffered HSDPA traffic in the second storage according to a HS-SCCH CRC test for the received HSDPA traffic. The resulting HARQ processed HSDPA traffic may be Turbo decoded. The UE may be operable to simultaneously perform HARQ processing on the buffered HSDPA traffic and Turbo decoding on HARQ processed HSDPA traffic (data) stored in IR memory. A CRC test may be performed on the Turbo decoded HSDPA traffic. The buffered HSDPA traffic in the first storage may be processed for the received legacy HSDPA traffic according to a HS-SCCH associated with the legacy HSDPA traffic. The buffered HSDPA traffic in the second storage may be processed for the received HS-SCCH-less HSDPA traffic using each of a set of, for example, four pre-determined transport formats. The received HS-SCCH-less HSDPA traffic may be decoded by performing HARQ processing and Turbo decoding for each of the four pre-determined transport formats.

Figure 1:
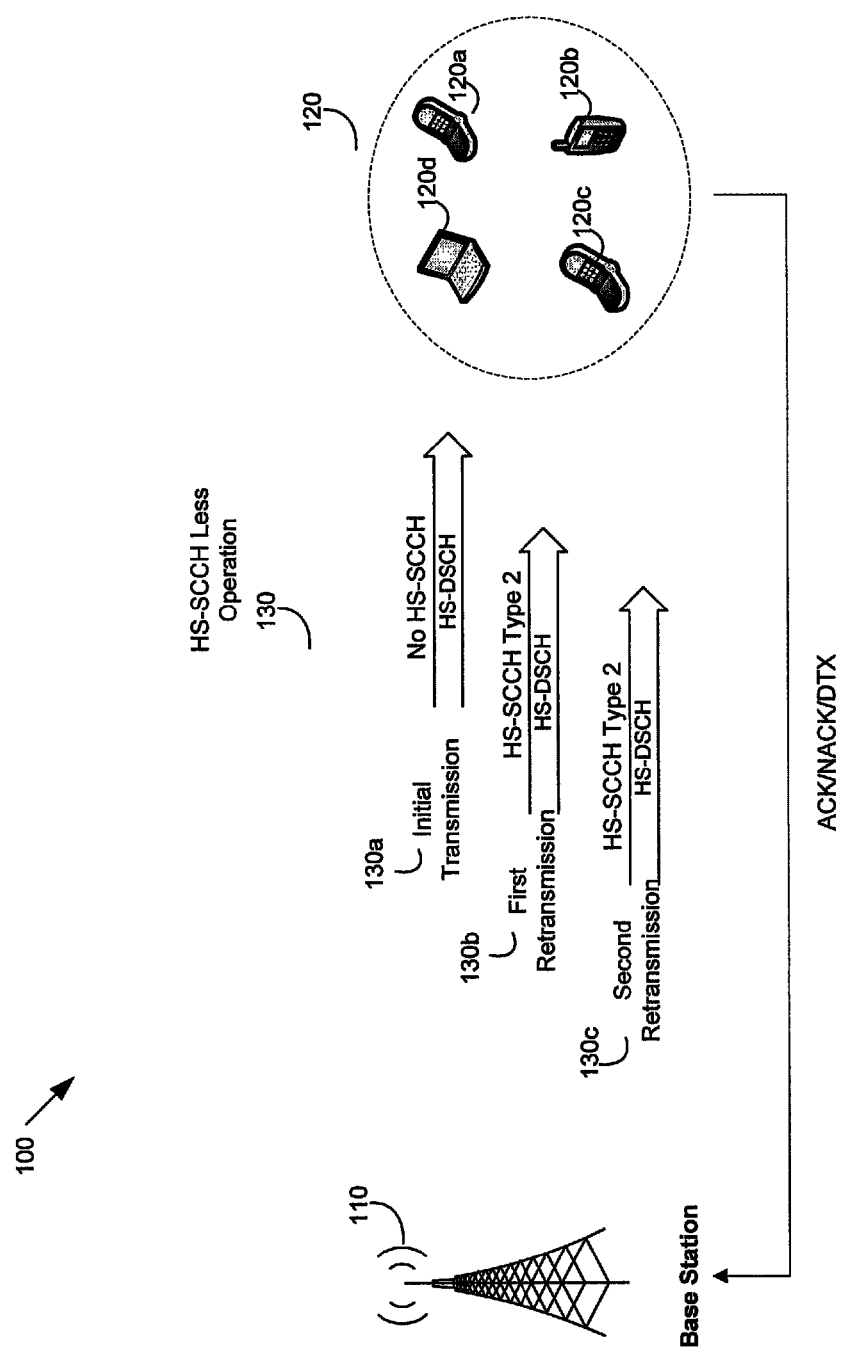
FIG. 1 is a diagram of an exemplary HSDPA enabled communication system that is operable to provide a HS-SCCH-less operation for continuous packet connectivity, in accordance with an embodiment of the invention.

FIG. 1 is a diagram of an exemplary HSDPA enabled communication system that is operable to provide a HS-SCCH-less operation for continuous packet connectivity, in accordance with an embodiment of the invention. Referring to FIG. 1, there is shown a base station 110 and a plurality of user equipments (UEs) 120, of which UEs 120a-120d are illustrated. A HS-SCCH-less operation 130 may be performed in the downlink communication.

The base station 110 may comprise suitable logic, circuitry, interfaces and/or code that may be operable to perform air interface processing and schedule communication resources in both uplink communications and downlink communications to various UEs such as the UE 120a in a timely manner. The base station 110 may be operable to support HSDPA and other downlink communication technologies. Various algorithms may be used by the base station 110 to determine which UE may receive a data packet and at what time the receiving should occur. In instances where HSDPA may be active, results of the determination may be reported to, for example, the UE 120q, via a High Speed Shared Control Channel (HS-SCCH). The base station 110 may be operable to transmit a HS-SCCH to notify the UE 120a of the control information for the next data transmission over a HS-DSCH. In this regard, the base station 110 may be operable to manage a HS-DSCH transmission via a legacy HS-SCCH operation or a HS-SCCH-less operation.

In the legacy HS-SCCH operation, the base station 110 may be operable to transmit a HS-SCCH with every HS-PDSCH transmission. The HS-SCCH-less operation 130 is a special HSDPA operation mode. In the HS-SCCH-less operation 130, the base station 110 may perform an initial HS-PDSCH transmission without signaling an associated HS-SCCH. The associated HS-SCCH may be transmitted in subsequent HS-PDSCH retransmissions. The utilization of the HS-SCCH-less operation may reduce the HS-SCCH signaling overhead and save UE battery consumption. For each HS-PDSCH transmission, the base station 110 may be operable to determine whether to apply the HS-SCCH-less operation 130 or not. For example, the base station 110 may be configured to perform the HS-SCCH-less operation 130 for services such as VoIP that may be characterized with relatively small size HS-PDSCH transmissions.

The HS-SCCH-less operation 130 may comprise an initial transmission 130a, a first retransmission 130b, and a second retransmission 130c. Quadrature phase shift keying (QPSK) and one or two pre-defined channelization codes may be used in the HS-SCCH-less operation 130. Different redundancy versions may be applied in different HS-PDSCH transmissions in, for example, the initial transmission 130a, the first retransmission 130b and the second retransmission 130c, respectively. In the initial transmission 130a, the base station 110 may be operable to perform a HS-PDSCH transmission to a target UE such as the UE 120a without transmitting an associated HS-SCCH. Redundancy version 0 may be utilized for the HS-PDSCH transmission in the initial transmission 130a. One of four pre-defined transport formats may be applied to the HS-PDSCH transmission in the initial transmission 130a. A correct transport format may be blindly detected at the UE 120a for the HS-PDSCH transmission in the initial transmission 130a. An ACK may be transmitted over a HS-DPCCH from the UE 120a to the base station 110 to indicate that corresponding data packets in the initial transmission 130a may be received successfully. In instances when the base station 110 may not receive an ACK from the UE 120a within a certain time period after the initial transmission 130a, this may be an indication that the UE 120a may not receive the data packets in the initial transmission 130a correctly. The base station 110 may then be configured to perform HS-PDSCH retransmissions.

The number of the HS-PDSCH retransmissions may be limited to, for example, two, in the HS-SCCH-less operation 130. In contrast to the initial transmission 130a, a HS-SCCH signaling may be utilized in the first retransmission 130b and the second retransmission 130c, respectively. The bits on the associated HS-SCCH may be re-interpreted in the HS-SCCH-less operation 130, accordingly. A HS-SCCH that is used in the legacy HS-SCCH operation is called HS-SCCH type 1. A HS-SCCH that is used in the HS-SCCH-less operation 130 is called HS-SCCH type 2. The redundancy versions of 3 and 4 may be used for corresponding HS-PDSCH transmissions in the first retransmission 130b and the second retransmission 130c, respectively. In addition, a UE specific CRC attachment may be used in the HS-SCCH-less operation 130. In the first retransmission 130b and the second retransmission 130c, an ACK or a NACK may be transmitted to the base station 110 to indicate that the corresponding HS-PDSCH transmissions may be received successfully or incorrectly.

A UE such as the UE 120a may comprise suitable logic circuitry, interfaces and/or code that may be operable to communicate radio frequency signals with the base station 110 utilizing, for example, HSDPA. In HSDPA reception, the UE 120 may be operable to detect relevant control information on a HS-SCCH for receiving an associated HS-PDSCH transmission from the base station 110. The control information may comprise, for example, the number of codes, new data indicator, and modulation type (QPSK or 16QAM). The HS-SCCH may be in a format of a HS-SCCH type 1 or a HS-SCCH type 2. In instances where the base station 110 may operate in a legacy HS-SCCH operation, the UE 120a may be operable to decode the control information for the associated HS-PDSCH transmission on the HS-SCCH type 1. In this regard, the UE 120a may be operable to continuously read and/or decode control information on the HS-SCCH type 1. As soon as the control information may be decoded, the UE 120a may be operable to switch to the associated HS-PDSCH resources for receiving data packets.

In instances where the base station 110 may operate in a HS-SCCH-less operation, the UE 120a may be operable to blind decode the HS-PDSCH channel using at most four different pre-determined transport formats when the decoding of the HS-SCCH fails the CRC check, e.g. HS-SCCH less operation is activated. The UE 120a may be operable to read and/or decode control information on the HS-SCCH type 2 for $1^{st}$ and $2^{nd}$ retransmission when HS-SCCH decoding passes the CRC check. A HS-PDSCH transmission may be received using one or two pre-configured channelization codes in the HS-SCCH less operation. In instances where the UE 120a may fail to decode the HS-SCCH type 2, then the UE 120a may be operable to blindly decode the HS-PDSCH transmission by using each of the four pre-determined transport formats. In instance where the UE 120a may be operable to receive the HS-PDSCH transmission correctly, the UE 120a may be operable to transmit an ACK to the base station 110 to indicate that the HS-PDSCH transmission may be received correctly at the UE 120a. In instance where the UE 120a may fail to receive the HS-PDSCH transmission correctly, the UE 120a may not transmit a negative acknowledgement (NACK) to the base station 110 in the initial transmission 130a. However, the UE 120a may be configured to transmit a NACK in the first retransmission 130b and/or the second retransmission 130c to indicate the failure in receiving the corresponding HS-PDSCH transmission at the UE 120a. Following successful decoding of the HS-SCCH type 2, the UE 120a may be operable to switch to associated HS-PDSCH resources to receiving data packets of the corresponding HS-PDSCH transmissions, accordingly.

In operation, the UE 120a may be operable to receive HSDPA data packets from the base station 110 over an associated HS-PDSCH. The base station 110 may be operable to perform the corresponding HS-PDSCH transmissions using a legacy HS-SCCH operation or a HS-SCCH-less operation. In the legacy HS-SCCH operation, the base station 110 may be operable to perform HS-PDSCH transmissions together with relevant control information in a HS-SCCH type 1. The UE 120a may be operable to detect relevant control information for receiving the HS-PDSCH transmissions. In the HS-SCCH-less operation 130, the base station 110 may be operable to perform HS-PDSCH transmissions together with relevant control information in a HS-SCCH type 2. In this regard, the UE 120a may be operable to receive a HS-PDSCH transmission with relevant control information in the HS-SCCH type 2. In instances when the UE 120a may fail to decode the HS-SCCH type 2 or may not receive the HS-SCCH type 2, the UE 120a may be operable to blindly decode the HS-PDSCH transmission by using up to four pre-determined transport formats. In instances where the UE 120a may be operable to decode the HS-SCCH type 2, successfully, the UE 120a may be operable to switch to associated HS-PDSCH resources to receive data packets of the corresponding HS-PDSCH transmissions. The UE 120a may be operable to transmit an ACK to the base station 110 to indicate the successful reception of the corresponding HS-PDSCH transmission. In instances where the UE 120a may fail to decode or receive the HS-SCCH type 2, correctly, the UE 120a may be operable to transmit a NACK to the base station 110 to indicate the failure of the corresponding HS-PDSCH transmission reception in the first retransmission 130b and/or the second retransmission 130c. No NACK may be transmitted to the base station 110 when a failure of the corresponding HS-PDSCH transmission reception in the initial transmission 130a occurs.

Figure 2:
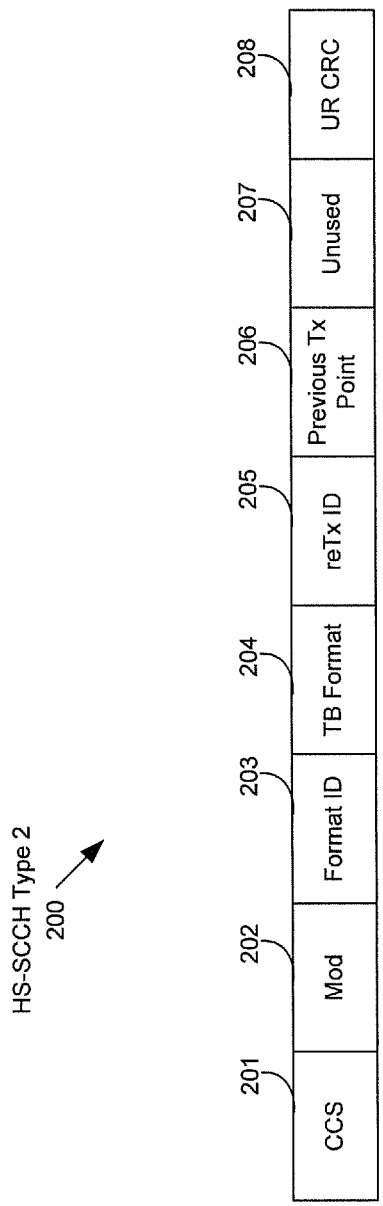
FIG. 2 is a block diagram illustrating an exemplary structure of HS-SCCH type 2 that is utilized to transmit control information for the first and second retransmissions in a HS-SCCH-less operation, in accordance with an embodiment of the invention.

FIG. 2 is a block diagram illustrating an exemplary structure of HS-SCCH type 2 that is utilized to transmit control information for the first and second retransmissions in a HS-SCCH-less operation, in accordance with an embodiment of the invention. Referring to FIG. 2, there is shown a HS-SCCH type 2 200 comprising a plurality of control information such as, for example, a Channelization Code Set (CCS) 201, a modulation (Mod) 202, a format ID 203, a transport block (TB) format 204, a rxTXID 205, a previous Tx point 206, a unused field 207, and a UE CRC mask 208.

The CCS 201 may comprise suitable logic circuitry, interfaces and/or code that may be operable to provide control information that may indicate channelization codes used for HS-PDSCH transmissions. The CCS 201 may be set to be 1 or 2. The value of 1 in the CCS 201 may indicate that a channelization code 1 may be used for a received HS-PDSCH transmission. The value of 2 in the CCS 201 may indicate that two HS-PDSCHs may be used for the received HS-PDSCH transmission and a channelization code 1 and 2 may be used for the two HS-PDSCHs, respectively.

The modulation (Mod) 202 may comprise suitable logic circuitry, interfaces and/or code that may indicate a modulation scheme such as QPSK that is used for the received HS-PDSCH transmission.

The format ID 203 may comprise suitable logic circuitry, interfaces and/or code that may be operable to provide transport format information for the received HS-PDSCH transmission over the one or two HS-PDSCHs indicated in the CCS 201.

The TB format 204 may comprise suitable logic circuitry, interfaces and/or code that may be operable to indicate one out of 4 transport block sizes configured by higher layers.

The rxTXID 205 may comprise suitable logic circuitry, interfaces and/or code that may be operable to indicate that the received HS-PDSCH transmission may correspond to the first retransmission 130b or the second retransmission 130c in the HS-SCCH-less operation 130.

The previous Tx point field 206 may comprise suitable logic circuitry, interfaces and/or code that may be operable to indicate the time of previous HS-PDSCH transmissions in terms of time offset from the current transmission time interval (TTI).

The unused field 207 may comprise suitable logic circuitry, interfaces and/or code that may be operable to indicate unused or reserved bits.

The UE CRC 208 may comprise suitable logic circuitry, interfaces and/or code that may be operable to provide a UE specific CRC. The UE specific CRC may comprise a 16 bit CRC coded or masked with a UE specific identifier such as H-RNTI The HS-SCCH type 2 200 may provide relevant control information to the UE 120*a* for receiving data packets over an associated HS-PDSCH. In instances where the base station 110 may be in a HS-SCCH-less operation, the UE 120 may be operable to store, for example, 13 TTIs of un-decodable HS-PDSCH transmissions received from the base station 110 into a circular buffer. In instances where HS-PDSCH transmissions may not be decoded in the initial transmission 130*a* and the first retransmission 130*b* due to the lack of corresponding control information, then the UE 120 may be operable to combine the HS-PDSCH transmission received in the first retransmission 130*b* with the HS-PDSCH transmission received in the initial HS-PDSCH transmission 130*a*. The combined HS-PDSCH transmission may be used to decode the HS-PDSCH transmission received in the second retransmission 130*c*. The previous Tx point 206 may then be utilized to indicate the relative TTI positions within the stored 13 TTIs in the circular buffer to identify the location of corresponding HS-PDSCH transmissions for combining and decoding a subsequent HS-PDSCH transmission.

Figure 3:
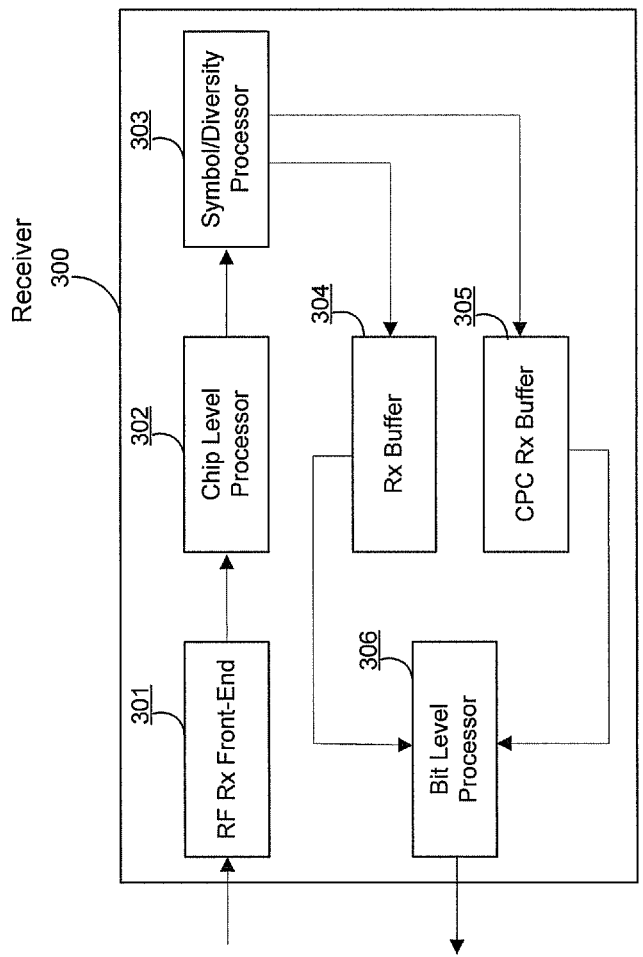
FIG. 3 is a block diagram illustrating an exemplary receiver that is operable to simultaneously support legacy HSDPA operation and HS-SCCH-less operation for continuous packet connectivity, in accordance with an embodiment of the invention.

FIG. 3 is a block diagram illustrating an exemplary receiver that is operable to support a HS-SCCH-less operation for continuous packet connectivity, in accordance with an embodiment of the invention. Referring to FIG. 3, there is shown a receiver 300. The receiver 300 comprises a RF Rx front-end 301, a chip level processor 302, a symbol/diversity processor 303, a Rx buffer 304, a CPC Rx buffer 305, and a bit level processor 306.

The RF Rx front-end 301 may comprise suitable logic, circuitry, interfaces and/or code that may be operable to process RF signals of a received HS-PDSCH transmission, for example, over a LTE/E-UTRA air interface. The RF Rx front-end 301 may be operable to convert the received RF signals to corresponding baseband signals and communicated with the chip level processor 302 for chip level baseband processing.

The chip level processor 302 may comprise suitable logic, circuitry, interfaces and/or code that may be operable to process baseband signals received from the RF Rx front-end 301 at chip level. For example, the chip level processor 302 may be operable to perform chip level equalization for intra-cell and/or inter-cell interference suppression. The chip level processor 302 may be operable to produce soft symbols via chip level combining. The produced soft symbols may be communicated with the symbol/diversity processor 303.

The symbol/diversity processor 303 may comprise suitable logic, circuitry, interfaces and/or code that may be operable to perform de-scrambling, de-channelization and/or transmit diversity decoding. The symbol/diversity processor 303 may be operable to support up to two sets of the physical channel configurations depending on whether the base station 110 in a legacy HS-SCCH operation or in a HS-SCCH-less operation. The symbol/diversity processor 303 may operate in a legacy mode or a continuous packet connectivity (CPC) mode to support the legacy HS-SCCH operation or the HS-SCCH-less operation of the base station 110, respectively. In the legacy mode, the symbol/diversity processor 303 may be operable to output processed soft symbols to the Rx buffer 304. In the CPC mode, the symbol/diversity processor 303 may be operable to output processed soft symbols to the Rx buffer 304 and the CPC Rx buffer 305, respectively. A single configuration bit may be used as a mode indication bit to control the operation mode of the symbol/diversity processor 303. For example, the single configuration bit may be set to 0 or 1 to indicate the symbol/diversity processor 303 in a legacy mode or a CPC mode, respectively.

The Rx buffer 304 may comprise suitable logic, circuitry, interfaces and/or code that may be operable to store I, Q samples of processed soft symbols from the symbol/diversity processor 303. The Rx buffer 304 may be implemented as a FIFO buffer. The Rx buffer 304 may comprise RAM, ROM, low latency nonvolatile memory such as flash memory and/or other suitable electronic data storage.

The CPC Rx buffer 305 may comprise suitable logic, circuitry, interfaces and/or code that may be operable to store I, Q samples of processed soft symbols from the symbol/diversity processor 303. The CPC Rx buffer 305 may be implemented as a FIFO buffer. The size of the CPC Rx buffer 305 may be large enough to store, for example, 1920 samples. Up to 3 slots of data associated with HS-PDSCH transmissions received from the base station 110 may be stored in the CPC-RX buffer 305. For a symbol-by-symbol HARQ operation, the size of the CPC-RX buffer 305 may be reduced to less than a TTI time period. Data format for the contents of the CPC-Rx buffer 305 may vary based on, for example, the number of physical channels that may be used in the received HS-PDSCH transmissions. The CPC Rx buffer 305 may comprise RAM, ROM, low latency nonvolatile memory such as flash memory and/or other suitable electronic data storage.

The bit level processor 306 may comprise suitable logic, circuitry, interfaces and/or code that may be operable to process symbols in the Rx buffer 304 or the CPC Rx buffer 305 at bit level according to a CRC test for the received HS-SCCH transmission. The bit level processor 306 may be operable to perform, for example, quantization, HARQ processing, and/or HSDPA Turbo decoding for symbols in the Rx buffer 304 and/or the CPC Rx buffer 305.

In an exemplary operation, the RF Rx front-end 301 of the receiver 300 may be operable to receive a RF signal of a HS-PDSCH transmission from, for example, the base station 110 via HSDPA. The received RF signal may be converted into a corresponding baseband signal and communicated to the chip level processor 302. The chip level processor 302 may be operable to process the received baseband signal at chip level to produced soft symbols for further symbol level processing via the symbol/diversity processor 303. The symbol/diversity processor 303 may operate in either a legacy mode or a CPC mode to support a legacy HS-SCCH operation or a HS_SCCH-less operation, respectively, of the base station 110. In the legacy mode, the symbol/diversity processor 303 may be operable to process the soft symbols from the chip level processor 302 and output into the Rx buffer 304. In instances where a CRC test on the HS-SCCH may be completed without an error, the resulting buffered symbols may be communicated with the bit level processor 308 for HSDPA HARQ and Turbo decoding, for example. In the CPC mode, the symbol/diversity processor 303 may be operable to process the soft symbols from the chip level processor 302 and output into the Rx buffer 304 as well as the CPC Rx buffer 304. A CRC test on the HS-SCCH may lead to bit level processing for the buffered symbols in the Rx buffer 304, or the CPC Rx buffer 305. In instances where a CRC test on HS-SCCH is completed without an error, the resulting buffered symbols in the Rx buffer 304 may be communicated with the bit level processor 306 for HSDPA HARQ and Turbo decoding. In instances where a CRC test on HS-SCCH is completed with an error, the resulting buffered symbols in the CPC Rx buffer 305 may be communicated with the bit level processor 306 for CPC-HARQ and Turbo decoding.

Figure 4:
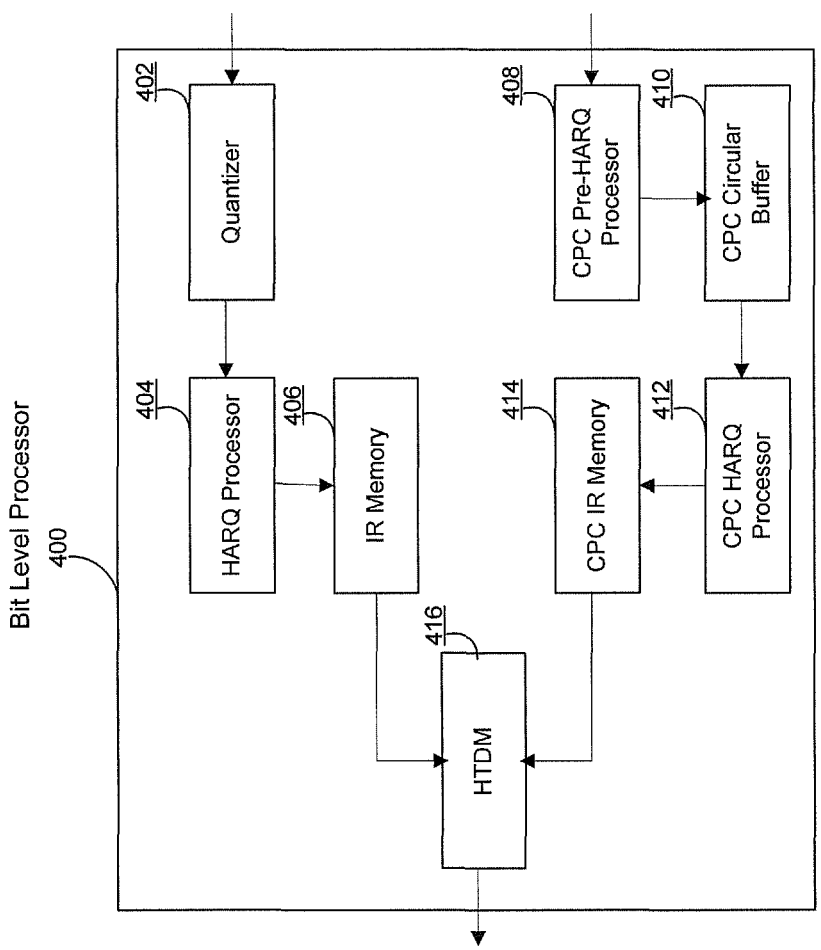
FIG. 4 is a block diagram illustrating an exemplary bit level processor that is utilized in a receiver to simultaneously support legacy HSDPA operation and HS-SCCH-less operation for continuous packet connectivity, in accordance with an embodiment of the invention.

FIG. 4 is a block diagram illustrating an exemplary bit level processor that is utilized in a receiver to support a HS-SCCH-less operation for continuous packet connectivity, in accordance with an embodiment of the invention. Referring to FIG. 4, there is shown a bit level processor 400. The bit level processor 400 comprises a quantizer 402, a HARQ processor 404, an incremental redundancy (IR) memory 406, a CPC pre-HARQ processor 408, a CPC circular buffer 410, a CPC HARQ processor 412, a CPC IR memory 414, and a HSDPA Turbo decoding module (HTDM) 416.

The quantizer 402 may comprise suitable logic, circuitry, interfaces and/or code that may be operable to change bit precision of soft symbols taken from the Rx buffer 304. The quantization step size may be determined based on the average signal energy in the Rx buffer 304. The average signal energy may be calculated over 64 symbols, for example.

The HARQ processor 404 may comprise suitable logic, circuitry, interfaces and/or code that may be operable to process quantized soft symbols from the quantizer 402 for various HARQ functions. For example, the HARQ processor 404 may be operable to split the quantized soft symbols from the quantizer 402 into a systematic symbol sequence, a parity 1 symbol sequence, and a parity 2 symbol sequence, respectively. Each of the resulting symbol sequences may be individually derate-matched from allocated physical channel capacity to corresponding allocated memory capacities in the IR memory 406. The HARQ processor 404 may be operable to perform IR combining of retransmitted blocks associated with the quantized soft symbols when need.

The IR memory 406 may comprise suitable logic, circuitry, interfaces and/or code that may be operable to store soft symbols from the HARQ processor 404 to support IR combining for up to, for example, 3 HARQ processors.

The CPC pre-HARQ processor 408 may comprise suitable logic, circuitry, interfaces and/or code that may be operable to process soft symbols taken from the CPC Rx buffer 305 to support HARQ functions. For example, the CPC pre-HARQ processor 408 may be operable to quantize the soft symbols from the CPC Rx buffer 305. The quantized soft symbols may be de-interleaved and output to the CPC circular buffer 410 for HSDPA Turbo decoding.

The CPC circular buffer 410 may comprise suitable logic, circuitry, interfaces and/or code that may be operable to store processed soft symbols from the CPC pre-HARQ processor 408 to support HARQ functions. The CPC circular buffer 410 may be operable to store, for example, 14 TTIs of processed soft symbols from the CPC pre-HARQ processor 408.

The CPC HARQ processor 412 may comprise suitable logic, circuitry, interfaces and/or code that may be operable to process soft symbols stored in the CPC circular buffer 410 for various HARQ functions. For example, the HARQ processor 412 may be operable to split the soft symbols from the CPC circular buffer 410 into a systematic symbol sequence, a parity 1 symbol sequence, and a parity 2 symbol sequence, respectively. Each of the resulting symbol sequences may be individually de-matched from allocated physical channel capacity to allocated memory capacities in the CPC IR memory 414. The CPC HARQ processor 412 may be operable to perform IR combining of retransmitted blocks when need.

The CPC IR memory 414 may comprise suitable logic, circuitry, interfaces and/or code that may be operable to store soft symbols from the CPC HARQ processor 412 to support IR combining for up to, for example, 3 parallel HARQ processing. For example, a memory space of 4533 soft symbols may be allocated for each HARQ processing. Additional 4533 soft symbol memory space may be also allocated to store soft symbols between the CPC-HARQ 412 and the HSDPA Turbo decoding module (HTDM) 416 to support blind format detection.

The HTDM 416 may comprise suitable logic, circuitry, interfaces and/or code that may be operable to perform Turbo decoding. In instances where the symbol/diversity processor 303 may be in a CPC mode, the HTDM 416 may be operable to support a UE specific CRC attachment, in which the 16-LSB of CRC parity check bits may be masked with a 16-bit UE ID. In instances where the base station 110 may be operable to transmit data using the HS-SCCH-less operation 130, the HTDM 416 may be operable to support at most four pre-defined transport formats in associated HS-PDSCH transmissions from the base station 110. In instances where the receiver 300 may receive an associated HS-PDSCH transmission from the base station 110 without an associated HS-SCCH, the HTDM 416 may be configured to blindly detect a correct transport format for the received HS-PDSCH transmission by using each of the four pre-defined transport formats. In this regard, the HTDM 416 may be operable to communicate with the CPC HARQ 412 for the associated HS PDSCH transmission to be processed using one of the four pre-determined transport formats. In instances when the HTDM 416 completes Turbo decoding with a CRC error over the processed HS-PDSCH transmission in a particular pre-determined transport format, this may imply that the particular pre-determined transport format may not be the correct transport format used in the received HS-PDSCH transmission. The HTDM 416 may be operable to trigger the CPC HARQ 412 to process the associated HS-PDSCH transmission using the next pre-determined transport format. In instances when the HTDM 416 completes Turbo decoding without a CRC error over the processed HS-PDSCH transmission in a particular pre-determined transport format, this may indicate that the particular pre-determined transport format may be the correct transport format in the received HS-PDSCH transmission.

In an exemplary operation, the bit level processor 400 may be operable to process soft symbols from the symbol/diversity processor 303 to derive or decode bits associated with an HS-PDSCH transmission received from the base station 110. The symbol/diversity processor 303 may operate in the legacy mode or the CPC mode to support the legacy HS-SCCH operation or the HS-SCCH-less operation of the base station 110, respectively.

In the legacy mode, the quantizer 402 may be operable to quantize the soft symbols from the Rx buffer 304 for a different bit precision. The quantized soft symbols may be communicated with the HARQ processor 404 for HARQ functions. The resulting HARQ processed symbols may be stored in the IR memory 406 for Turbo decoding at the HTDM 416 when need.

In the CPC mode, soft symbols from the symbol/diversity processor 303 may be stored in the Rx buffer 304 and CPC Rx buffer 305, respectively. The bit level processor 400 may be operable to process the soft symbols in the Rx buffer 304 or CPC Rx buffer 305 according to a corresponding HS-SCCH CRC test. In instances where a HS-SCCH CRC test may be completed without an error, the soft symbols from the Rx buffer 304 may be processed via the quantizer 402 and the HARQ processor 404. The resulting processed symbols may be stored in the IR memory 406 to be used for Turbo decoding at the HTDM 416 when need. In instances where a HS-SCCH CRC test may be completed with an error, the soft symbols from the CPC Rx buffer 305 may be processed via the CPC pre-HARQ processor 408 and output into the CPC circular buffer 410 for further HARQ processing via the CP HARQ processor 412. The CPC HARQ processed symbols may be stored in the CPC IR memory 414 to be used for Turbo decoding at the HTDM 416 when need.

Figure 5:
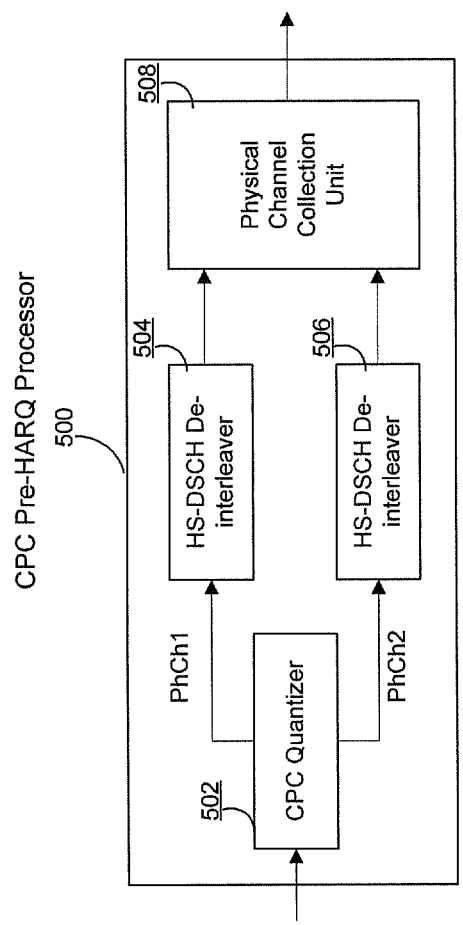
FIG. 5 is a block diagram illustrating an exemplary CPC pre-HARQ processor that is utilized in a receiver to support a HS-SCCH-less operation for continuous packet connectivity, in accordance with an embodiment of the invention.

FIG. 5 is a block diagram illustrating an exemplary CPC pre-HARQ processor that is utilized in a receiver to support a HS-SCCH-less operation for continuous packet connectivity, in accordance with an embodiment of the invention. Referring to FIG. 5, there is shown a CPC pre-HARQ processor 500. The CPC pre-HARQ processor 500 comprises a CPC quantizer 502, HS-DSCH de-interleavers 504 and 506, and a physical channel collection unit 508.

The CPC quantizer 502 may comprise suitable logic, circuitry, interfaces and/or code that may be operable to quantize symbols from the CPC Rx buffer 305 for a different bit precision. The quantization step may be determined based on, for example, the average signal energy in the CPC Rx buffer 305. The average signal energy may be calculated, for example, over 64 symbols. Various quantization algorithms may be applied to quantize the symbols from the CPC Rx buffer 305. For example, a 10-bit QPSK symbol of y from the CPC Rx Buffer 305 may be quantized by m=clip(y step)=max (min(y step,15),−15); step=4/g, where m is the quantized y and g is the average signal energy calculated over 64 QPSK symbols in the CPC Rx buffer 305.

The HS-DSCH de-interleavers 504 and 506 may comprise suitable logic, circuitry, interfaces and/or code that may be operable to de-interleaver symbols on two assigned physical channels, respectively. The resulting de-interleaved symbols may be communicated with the physical channel collection unit 508.

The physical channel collection unit 508 may comprise suitable logic, circuitry, interfaces and/or code that may be operable to collect de-interleaved symbols from the HS-DSCH de-interleavers 504 and 506, respectively. The collected symbols may be placed sequentially into the CPC circular buffer 410 in a determined order.

In an exemplary operation, symbols on two assigned physical channels may be quantized, respectively. The resulting quantized symbols of the two assigned physical channels may be de-interleaved via the HS-DSCH de-interleavers 504 and 506, respectively. The physical channel collection unit 508 may be operable to collect symbols from the HS-DSCH de-interleavers 504 and 506 to form a symbol sequence in a determined order. The formed symbol sequence may be placed into the CPC circular buffer 410 for further HARQ processing.

Figure 6:
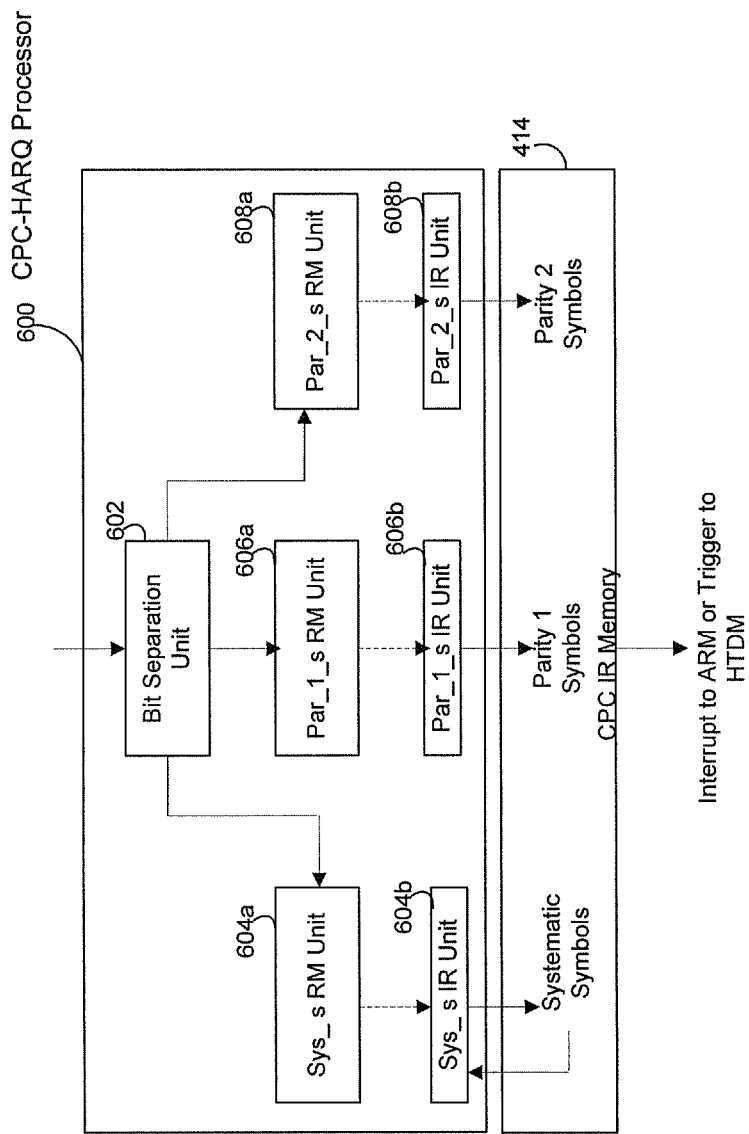
FIG. 6 is a block diagram illustrating an exemplary CPC HARQ processor that is utilized in a receiver to support a HS-SCCH-less operation for continuous packet connectivity, in accordance with an embodiment of the invention.

FIG. 6 is a block diagram illustrating an exemplary CPC HARQ processor that is utilized in a receiver to support a HS-SCCH-less operation for continuous packet connectivity, in accordance with an embodiment of the invention. Referring to FIG. 6, there is shown a CPC HARQ processor 600, which is coupled to the CPC IR memory 414. The CPC HARQ processor 600 comprises a bit separation unit 602, a systematic symbol (sys_s) rate matching (RM) unit 604a, a systematic symbol (sys_s) incremental combining (IR) unit 604b, a parity 1 symbol (par_1_s) rate matching (RM) unit 606a, a par_1_s IR unit 606b, a par_2_s RM unit 608a and a par_2_s IR unit 608b.

The CPC HARQ processor 600 may comprise suitable logic, circuitry, interfaces and/or code that may be operable to process symbols from the CPC circular buffer 410 for various HARQ functions such as symbol splitting, symbol-level rate matching and/or transmission block combining. The CPC-HARQ processor 600 may be operable to process symbols from the CPC circular buffer 410 using various procedures such as, for example, type 0, type 1 and type 2 processing, in accordance with the initial transmission 130a, the first retransmission 130b, and the second retransmission 130c, respectively.

In the type 0 processing, symbols in the initial transmission 130a may be processed in a pre-determined transport format. The resulting processed symbols may be output into a virtual space in the CPC IR memory 414 for Turbo decoding via the HTDM 416. In instances where a CRC error may be identified at the HTDM 416, the CPC HARQ processor 600 may be activated or signaled to process the symbols in the initial transmission 130a in next pre-determined transport format. Up to four different pre-determined transport formats may be supported by the CPC HARQ processor 600. In instances where the symbols in the initial transmission 130a may be Turbo decoded without a CRC error, the CPC HARQ processor 600 may stop processing the symbols in the initial transmission 130a. In instances where the symbols in the initial transmission 130a may be processed in each of the four pre-determined transport formats and a CRC error may still remain at the HTDM 416, the CPC HARQ processor 600 may be activated to perform type 1 processing on symbols in the first retransmission 130b.

In the type 1 processing, symbols in the first retransmission 130b may be combined with the symbols in the initial transmission 130a which are stored in the CPC circular buffer and output into the CPC IR memory 414. In instances where the symbols in the first retransmission 130b may be Turbo decoded without a CRC error, the CPC HARQ processor 600 may stop processing the symbols in the first retransmission 130b. Otherwise, the CPC HARQ processor 600 may be operable to perform type 2 processing on symbols in the second retransmission 130c.

In the type 2 processing, symbols in the second retransmission 130c may be combined with symbols in the initial transmission 130a and/or the first retransmission 130b. The combined symbols may be output into the CPC IR memory 414 for Turbo decoding.

The bit separation unit 602 may comprise suitable logic, circuitry, interfaces and/or code that may be operable to split bits of symbols from the CPC circular buffer 410 into a systematic symbol sequence, a parity 1 symbol sequence and a parity 2 symbol sequence, respectively.

The sys_s RM unit 604a may comprise suitable logic, circuitry, interfaces and/or code that may be operable to rate match the systematic symbol sequence from allocated physical channel capacity to corresponding allocated IR memory capacity in the CPC IR memory 414.

The sys_s IR unit 604b may comprise suitable logic, circuitry, interfaces and/or code that may be operable to IR combine symbols from the sys_s RM unit 604a with stored systematic symbols in the CPC IR memory 414.

The par_1_s RM unit 606a may comprise suitable logic, circuitry, interfaces and/or code that may be operable to rate match the parity 1 symbol sequence from allocated physical channel capacity to corresponding allocated IR memory capacity in the CPC IR memory 414.

The par_1_s IR unit 606b may comprise suitable logic, circuitry, interfaces and/or code that may be operable to IR combine symbols from the par_1_s RM unit 606a with stored parity 1 symbols in the CPC IR memory 414.

The par_2_s RM unit 608a may comprise suitable logic, circuitry, interfaces and/or code that may be operable to rate match the parity 2 symbol sequence from allocated physical channel capacity to corresponding allocated IR memory capacity in the CPC IR memory 414.

The par_2_s IR unit 608b may comprise suitable logic, circuitry, interfaces and/or code that may be operable to IR combine symbols from the par_2_s RM unit 608*a* with stored parity 2 symbols in the CPC IR memory 414.

In an exemplary operation, the CPC HARQ processor 600 may be operable to HARQ process symbols from the CPC circular buffer 410 in one of four pre-determined transport formats. For each pre-determined transport format, symbols from the CPC circular buffer 410 may be split into a systematic symbol sequence, a parity 1 symbol sequence and a parity 2 symbol sequence, respectively. The systematic symbol sequence may be rate matched via the sys_s RM unit 604*a* into an allocated IR memory capacity in the CPC IR memory 414. Retransmitted symbols of the systematic symbol sequence may be combined with systematic symbols stored in the CPC IR memory 414 via the sys_s IR unit 604*b* for Turbo decoding. The parity 1 symbol sequence may be rate matched via the par_1_s RM unit 606*a* to allocated IR memory capacity in the CPC IR memory 414. Retransmitted symbols of the parity 1 symbol sequence may be combined with parity 1 symbols in the CPC IR memory 414 via the par_1_s IR unit 606*b* for Turbo decoding. The parity 2 symbol sequence may be rate matched via the par_2_s RM unit 608*a* to allocated IR memory capacity in the CPC IR memory 414. Retransmitted symbols of the parity 2 symbol sequence may be combined with parity 2 symbols in the CPC IR memory 414 via the par_2_s IR unit 608*b* for Turbo decoding. In this regard, the received symbols may not need to be physically split into systematic, parity 1 and parity 2 symbol sequences. Instead a buffer-less operation may be used to calculate corresponding location in the CRC_IR memory 414 for the received symbol based on the symbol location in the CPC circular buffer 410. After de-rate matching, IR combining if needed, the symbol is then placed in the calculated CPC IR memory.

Figure 7:
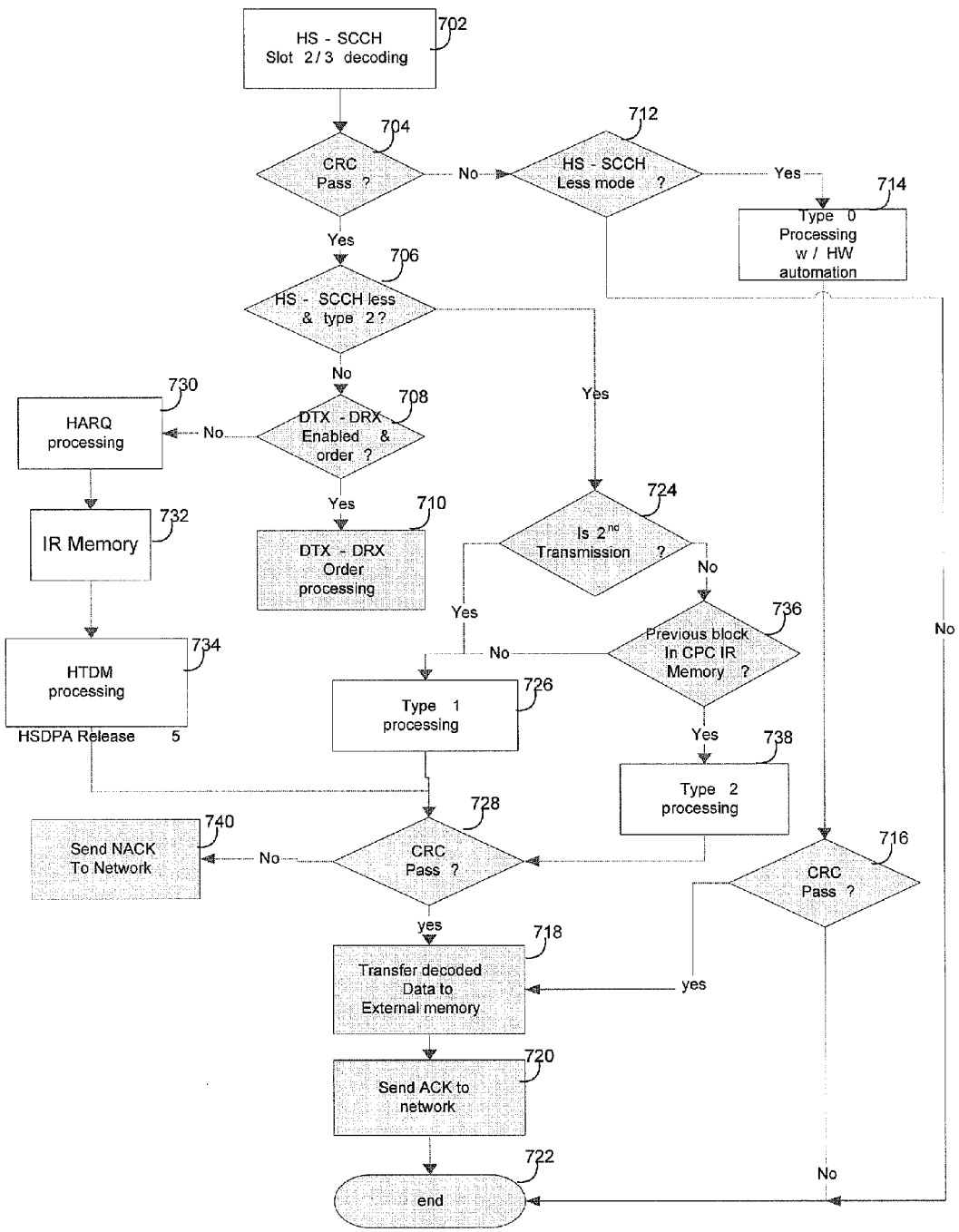
FIG. 7 is a flow chart illustrating an exemplary HSDPA operation in Cell-DCH state, in accordance with an embodiment of the invention.

FIG. 7 is a flow chart illustrating an exemplary HSDPA operation in Cell-DCH state, in accordance with an embodiment of the invention. A Cell_DCH state may be characterized by a dedicated physical channel (HS-PDSCH) allocated to a specific UE such as the UE 120*a*. A base station such as the base station 110 may perform a legacy HS_SCCH operation and a HS-SCCH-less operation only in the Cell_DCH state. Referring to FIG. 7, the exemplary steps start in step 702, where the UE 120*a* in Cell-DCH state may be operable to perform a shared or slow control channel decoding of a HS-PDSCH transmission. The shared control channel decoding may also be referred to as slot 2/3 decoding to indicate the operation of HS-SCCH decoding when the HS-SCCH decoding passes a CRC check. In step 704, it may be determined whether symbols on an associated HS-SCCH may pass a CRC test. In instances where the symbols on the associated HS-SCCH may pass the CRC test, then in step 706, where it may be determined whether the UE 120*a* may support the HS-SCCH-less operation 130 of the base station 110 and may be operable to perform the HS-SCCH type 2 processing. In instances where the UE 120 may not support the HS-SCCH-less operation 130 of the base station 110 and may not be operable to the HS-SCCH type 2 processing, then in step 708, it may be determined whether the UE 120*a* may be operable to enable and schedule discontinuous transmission/discontinuous receiving (DTx/DRx) in a specific order. In instances where the DTx-DRx may be enabled and scheduled in a specific order, then in step 710, the UE 120*a* may be operable to perform the corresponding DTx-DRx processing according to the specific order.

In step 704, in instances where the symbols on the HS-SCCH may not pass a CRC test, then in step 712, it may be determined whether the HS-SCCH-less operation mode may be supported. In instances where the HS-SCCH-less operation mode may be supported, then in step 714, the CPC HARQ processor 412 may be activated to perform type 0 processing via hardware automation, for example. The CPC HARQ processor 412 may be operable to acquire symbols from the CPC circular buffer 410. The acquired symbols may be processed in a pre-determined transport format. Up to four pre-determined transport formats may be used to support blind format detection. The HTDM 416 may be operable to Turbo decode the resulting processed symbols to estimate bits on the associated HS-PDSCH. In step 716, it may be determined whether the estimated bits on the associated HS-PDSCH may pass a CRC test. In instances where the estimated bits on the associated HS-PDSCH may pass a CRC test, then in step 718, where the estimated bits on the associated HS-PDSCH may be transferred to, for example, an external memory, to be used for corresponding application. In step 720, the HTDM 416 may be operable to send an ACK message to indicate the successful reception of the HS-PDSCH transmission. The exemplary steps may stop in step 722.

In step 706, in instances where the UE 120*a* may support the HS-SCCH-less operation mode and the HS-SCCH type 2 processing, then in step 724, it may be determined whether the current symbols received on the associated HS-PDSCH is in the second transmission (the first retransmission). In instances where the current symbols on the associated HS-PDSCH is in the second transmission (the first retransmission), the in step 726, the CPC HARQ processor 412 may be activated to perform type 1 processing on symbols acquired from the CPC circular buffer 410. The acquired symbols may be combined with the current symbols on the associated HS-PDSCH and output into the CPC IR memory 414. The symbols in the CPC IR memory 414 may be Turbo decoded via the HTDM 416 to produce an estimation of bits received on the associated HS-PDSCH. A CRC test may be applied to the estimated bits in the HTDM 416. In step 728, it may be determined whether the estimated bits may pass a CRC test. In instances where the estimated bits may pass the CRC test, then the exemplary steps may continue in step 718.

In step 708, in instances where the DTx-DRx may be not enabled and/or may not be scheduled in a specific order, then in step 730, the UE 120*a* may be operable to activate the HARQ processor 404 to perform a legacy HARQ process. The HARQ processor 404 may be operable to process symbols from the quantizer 402 for HARQ functions. In step 732, the resulting HARQ processed symbols may be output and stored in the IR memory 406. In step 734, the stored symbols in the IR memory 406 may be Turbo decoded via the HTDM 416. The exemplary steps may continue in step 728.

In step 712, in instances where the HS-SCCH-less operation mode may not be supported, then the exemplary steps may stop in step 722.

In step 716, in instances where the estimated bits may not pass a CRC test successfully, then the exemplary steps stop in step 722.

In step 724, in instances where the current received symbols on the associated HS-PDSCH may not be in the second transmission (the first retransmission), the in step 736, it may be determined whether the previous symbols may be available in the CPC IR memory 414. In instances where the previous symbols may be available in the CPC IR memory 414, then in step 738, where the CPC HARQ processor 412 may be activated to perform type 2 processing. The HARQ processor 412 may be operable to acquire data from the CPC IR memory 414. The acquired data may be combined with the current received symbols on the associated HS-PDSCH and output into the CPC IR memory 414. The stored symbols in the CPC IR memory 414 may be Turbo decoded via the HTDM 416. A CRC check may be applied to the resulting estimated bits at the HTDM 416. The exemplary steps may continue in step 728.

In step 728, in instances where the estimated bits may not pass the CRC test, then in step 740, where the UE 120*a* may be operable to send a NACK to network to indicate the failure of the reception for the associated HS-PDSCH transmission.

In step 736, in instances where the previous symbols on the associated HS-PDSCH may not be available in the CPC IR memory 414, then the exemplary steps may continue in step 726.

Figure 8:
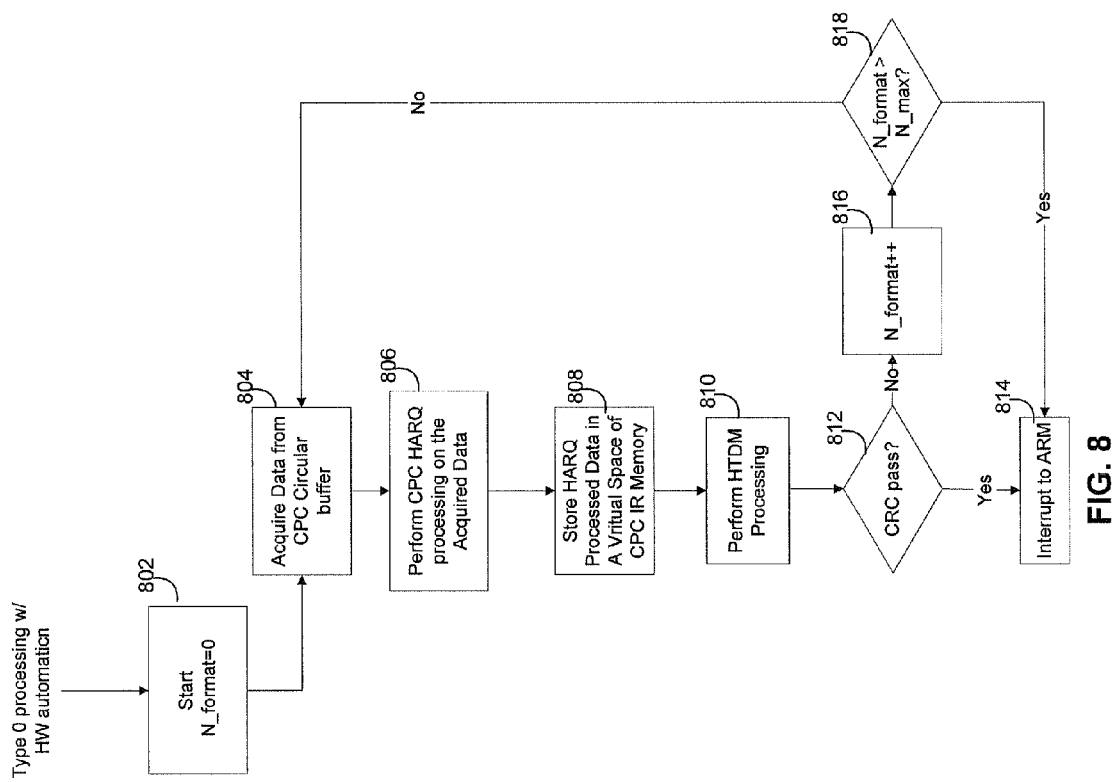
FIG. 8 is a flow chart illustrating an exemplary HS-SCCH-less operation that is utilized for type 0 processing, in accordance with an embodiment of the invention.

FIG. 8 is a flow chart illustrating an exemplary HS-SCCH-less operation that is utilized for type 0 processing, in accordance with an embodiment of the invention. The exemplary steps start in step 802, where the CPC HARQ processor 412 may be operable to start CPC HARQ type 0 processing with N_format=0, where N_format is the transport format index. Up to four different pre-determined transport formats may be supported by the CPC HARQ processor 412. The maximum transport format index N_max=3. In step 804, the CPC HARQ processor 412 may be operable to acquire symbols from the CPC circular buffer 410. In step 806, the CPC HARQ processor 412 may be operable to perform CPC HARQ processing on the acquired symbols as described with respect to FIG. 6. In step 808, the CPC HARQ processor 412 may output the resulting processed symbols into a virtual space in the CPC IR memory 414 for Turbo decoding. In step 810, the HTDM 416 may be activated to Turbo decode the symbols from the CPC IR memory 414 to produce estimated bits received on the associated HS-PDSCH. A CRC test may be applied to the estimated bits for possible packet retransmission. In step 812, it may be determined whether the estimated bits may pass the CRC test. In instances where the estimated bits may pass the CRC test successfully, then in step 814, the HTDM 416 may be operable to send an interrupt to ARM to stop the CPC HARQ processing.

In step 812, in instances where the estimated bits may not pass the CRC test successfully, then the exemplary steps may continue step 816, where the transport format index N_format may be increased by a step of one. In step 818, it may be determined whether N_format>N_max. In instances where N_format>N_max, then the exemplary steps may continue in step 814.

In step 818, in instances where N_format≤N_max, then the exemplary steps may return to step 804.

Figure 9:
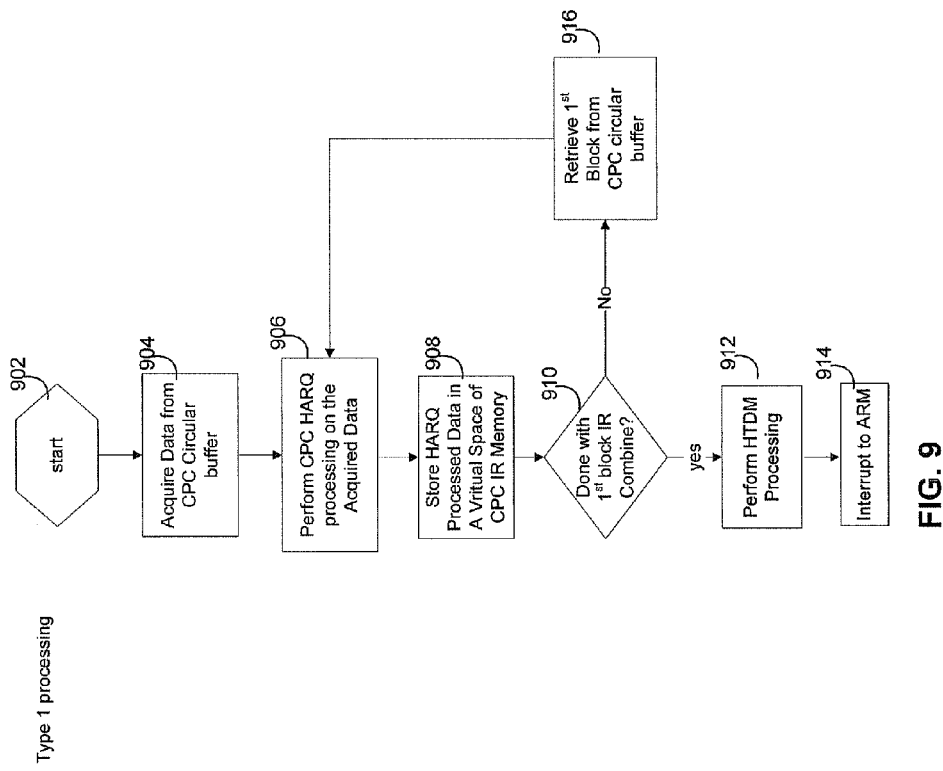
FIG. 9 is a flow chart illustrating an exemplary HS-SCCH-less operation that is utilized for type 1 processing, in accordance with an embodiment of the invention.

FIG. 9 is a flow chart illustrating an exemplary HS-SCCH-less operation that is utilized for type 1 processing, in accordance with an embodiment of the invention. Referring to FIG. 9, the exemplary steps start in step 902, where a UE such as the UE 120*a* may be operable to perform HS_SCCH type 1 processing. In step 904, the CPC HARQ processor 412 may be operable to acquire symbols from the CPC circular buffer 410. In step 906, the CPC HARQ processor 412 may be operable to perform CPC HARQ processing on the acquired symbols as described with respect to, for example, FIG. 6. In step 908, the CPC HARQ processor 412 may output the resulting processed symbols into a virtual space in the CPC IR memory 414 for Turbo decoding. In step 910, it may be determined whether an IR combining may be done with regard to the initial HS-PDSCH transmission. In instances where an IR combining may be done with regard to the initial HS-PDSCH transmission, then in step 912, the HTDM 416 may be activated to Turbo decode the symbols from the CPC IR memory 414. The HTDM 416 may be operable to send an interrupt to ARM (DPS) to stop the CPC HARQ processing following a successful reception of the HS-PDSCH transmission.

In step 910, in instances where an IR combining may not be done with regard to the initial HS-PDSCH transmission, then in step 916, where the CPC HARQ processor 412 may be operable to retrieve the symbols in the initial HS-PDSCH transmission from the CPC circular buffer 410 to IR combine with current received symbols on the associated HS-DPSCH. The exemplary steps may return to step 906.

Figure 10:
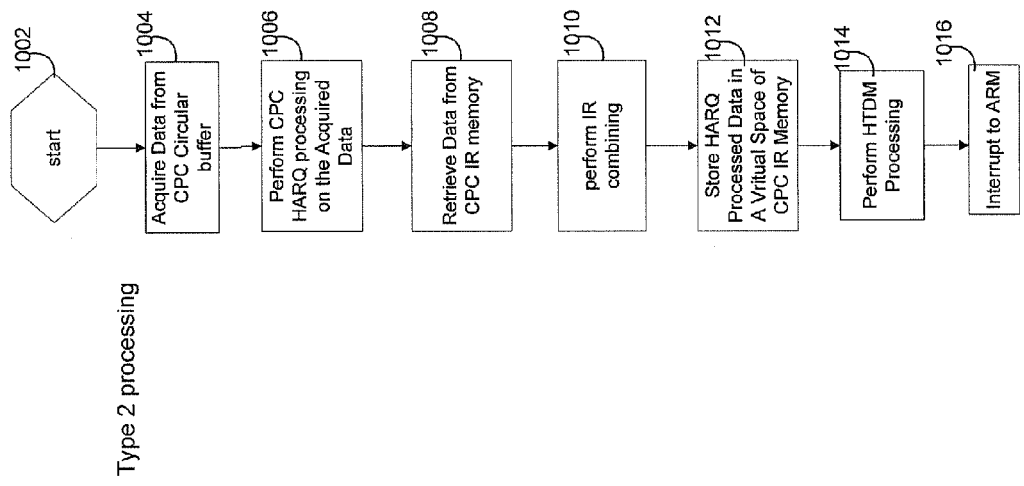
FIG. 10 is a flow chart illustrating an exemplary HS-SCCH-less operation that is utilized for type 2 processing, in accordance with an embodiment of the invention.

FIG. 10 is an exemplary HS-SCCH-less operation that is utilized for type 2 processing, in accordance with an embodiment of the invention. Referring to FIG. 10, the exemplary steps start in step 1002, where a UE such as the UE 120*a* may be operable to perform HS_SCCH type 2 processing. In step 1004, the CPC HARQ processor 412 may be operable to acquire symbols from the CPC circular buffer 410. In step 1006, the CPC HARQ processor 412 may be operable to perform CPC HARQ processing on the acquired symbols as described with respect to, for example, FIG. 6. In step 1008, the CPC HARQ processor 412 may be operable to retrieve symbols from the CPC IR memory 414. In step 1010, the CPC HARQ processor 412 may be operable to IR combine the retrieved symbols with the current received symbols on the associated HS-PDSCH. In step 1012, the CPC HARQ processor 412 may be operable to output the resulting processed symbols into a virtual space in the CPC IR memory 414 for Turbo decoding. In step 1014, the HTDM 416 may be activated to Turbo decode the symbols from the CPC IR memory 414. In step 1016, the HTDM 416 may be operable to send an interrupt to ARM to stop the CPC HARQ processing following a successful reception of the HS-PDSCH transmission.

Aspects of a method and system for continuous packet connectivity are provided. In accordance with various embodiments of the invention, a UE such as the UE 120*a* may be operable to receive data packets using HSDPA from the base station 110. The base station 110 may be operable to transmit the data packets in a HS-PDSCH to the UE 120*a* via a legacy HS-SCCH operation or a HS-SCCH-less operation. In instances where the base station 110 may be operable to transmit the data packets in the HS-PDSCH using the HS-SCCH-less operation 130, the data packets may be transmitted to the UE 120*a* in the initial transmission 130*a*, the first retransmission 130*b*, and/or the second retransmission 130*c*, respectively. A relevant HS-SCCH may be transmitted together with the data packets to the UE 120*a* only in the first retransmission 130*b* and the second retransmission 130*c*.

In the initial transmission 130*a*, the UE 120*a* may be operable to receive the data packets in the HS-PDSCH without a relevant HS-SCCH. In this regard, the received data packets may be processed via the chip level processor 302 and the symbol/diversity level 303, respectively. The resulting soft symbols for the received data packets may be buffered into the Rx buffer 304 and CPC Rx buffer 305, concurrently. Data in the Rx buffer 304 and CPC Rx buffer 305 may be decoded concurrently as described with respect to, for example, FIG. 4. The UE 120*a* may be operable to receive the data packets in the CPC Rx buffer 305 using a pre-determined transport format. At most four pre-determined transmit formats may be utilized by the UE 120*a* to receive the data packets. The UE 120*a* may be operable to HARQ process the data packets in the pre-determined transport format from the CPC Rx buffer 305 via the CPC HARQ processor 412. The processed data packets from the CPC HARQ processor 412 may output into the CPC IR memory 414 for further Turbo decoding at the HTDM 416. A CRC test may be performed at the HTDM 416 on the resulting Turbo decoded data packets for data integrity. The resulting CRC test result may be utilized to detect a correct transport format that is used in the received data packets in the HS-PDSCH. In instances where the CRC test may complete without a CRC error, the HTDM 416 may be operable to send an ACK message to the base station 110 to indicate the success in receiving the data packets correctly at the UE 120*a*. In instances where the CRC test may complete with a CRC error, the HTDM 416 may not send an indication back to the base station 110 regarding the reception of the data packets at the UE 120*a*. The base station 110*a* may then be operable to perform the first retransmission 130*b* and/or the second retransmission 130*c*. Accordingly, the UE 120*a* may be operable to receive the data packets in the HS-PDSCH with a relevant HS-SCCH. The UE 120*a* may be operable to decode the received relevant HS-SCCH. The UE 120*a* may be operable to switch to the corresponding HS-PDSCH resources to receive the data packets based on control information from the decoded relevant HS-SCCH.

In accordance with various embodiments of the invention, a UE such as the UE 120*a* may be operable to receive HSDPA traffic (HSDPA data packets), which may comprise legacy HSDPA traffic and HS-SCCH-less HSDPA traffic. The UE 120*a* may be operable to concurrently process the received legacy HSDPA traffic and the received HS-SCCH-less HSDPA traffic. The UE 120*a* may be operable to concurrently buffer the received HSDPA traffic into the Rx buffer 304 and the CPC Rx buffer 305, respectively, so as to support blindly receiving legacy HSDPA traffic and HS-SCCH-less HSDPA traffic. The UE 120*a* may be operable to process the buffered HSDPA traffic in the Rx buffer 304 or the CPC Rx buffer 305. The HARQ processor 404 or the CPC HARQ processor 412 may be utilized to perform HARQ processing on the buffered HSDPA traffic in the Rx buffer 304 or the buffered HSDPA traffic in the CPC Rx buffer 305 according to an associated HS-SCCH CRC test. The resulting HARQ processed HSDPA traffic may be stored in the IR memory 406 or the CPC IR memory 414 for Turbo decoding. Turbo decoding on the previously HARQ processed HSDPA traffic, which is stored in the IR memory 406 or in the CPC IR memory 414 may be performed simultaneously with HARQ processing on the buffered HSDPA traffic in the Rx buffer 304 or the CPC Rx buffer 305. The HTDM 416 may be operable to perform CRC test on the resulting Turbo decoded HSDPA traffic from the Rx buffer 304 or the CPC Rx buffer 305. The buffered HSDPA traffic in the Rx buffer 304 may be processed for the received legacy HSDPA traffic according to a HS-SCCH associated with the legacy HSDPA traffic. The buffered HSDPA traffic in the CPC Rx buffer 305 may be processed for the received HS-SCCH-less HSDPA traffic using each of a set of pre-determined transport formats, for example, four pre-determined transport formats. A correct transport format may be determined from the set of pre-determined transport formats, for receiving HS-SCCH-less HSDPA traffic. The received HS-SCCH-less HSDPA traffic may be decoded by performing HARQ processing and Turbo decoding using each of the set of pre-determined transport format.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for continuous packet connectivity.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
   performing, by one or more processors and circuits in a communication device, functions comprising:
      receiving High Speed Downlink Packet Access (HSDPA) traffic comprising legacy HSDPA traffic and High-speed Shared Control Channel (HS-SCCH) less HSDPA traffic, wherein the HSDPA traffic includes an initial transmission, a first retransmission, and a second retransmission;
      performing a first Cyclic Redundancy Check (CRC) test on a control channel associated with the received HSDPA traffic, wherein the first CRC test is performed on a first portion of the control channel associated with the initial transmission of the received HSDPA traffic;
      if the first CRC test fails, blindly decoding the initial transmission; and
         performing a second CRC test on the control channel, wherein the second CRC test is performed on a second portion of the control channel associated with the first retransmission and the second retransmission;
      if the second CRC test passes,
         retrieving control information from the control channel, the control information associated with the first retransmission or the second retransmission; and
         decoding the second retransmission using the retrieved control information.

2. The method of claim 1, further comprising:
   concurrently buffering the received HSDPA traffic in a first storage and in a second storage.

3. The method according to claim 2, further comprising hybrid automatic retransmission request (HARQ) processing buffered HSDPA traffic in the first storage or the buffered HSDPA traffic in the second storage according to a corresponding HS-SCCH CRC test.

4. The method according to claim 3, further comprising storing an output of the HARQ processing from the first storage or the second storage.

5. The method according to claim 4, further comprising Turbo decoding the stored output from the first storage or the second storage.

6. The method according to claim 4, further comprising:
performing HARQ processing on the buffered HSDPA traffic in the first storage or the second storage; and
Turbo decoding a corresponding stored HARQ processed HSDPA traffic.

7. The method according to claim 6, wherein the Turbo decoding further comprises Turbo decoding the HARQ processed HSDPA traffic for each transport format from a set of predetermined transport formats.

8. The method of claim 2, further comprising:
processing the buffered HSDPA traffic of the first storage according to an HS-SCCH associated with the legacy HSDPA traffic to obtain the legacy HSDPA traffic.

9. The method of claim 1, wherein blindly decoding the initial transmission is based on a set of pre-determined transport formats.

10. The method of claim 1, wherein the initial transmission is the HS-SCCH less HSDPA traffic and the first retransmission is the legacy HSDPA traffic.

11. A system for signal processing, the system comprising:
one or more processors and/or circuits for use within a communication device configured to, wherein:
receive data packets from a base station;
receive High Speed Downlink Packet Access (HSDPA) traffic comprising legacy HSDPA traffic and High-speed Shared Control Channel (HS-SCCH) less HSDPA traffic, wherein the HSDPA traffic includes an initial transmission, a first retransmission, and a second retransmission; and
perform a first Cyclic Redundancy Check (CRC) test on a control channel associated with the received HSDPA traffic, wherein the first CRC test is performed on a first portion of the control channel associated with the initial transmission of the received HSDPA traffic,
if the first CRC test fails, blindly decode the initial transmission, and perform a second CRC test on the control channel, wherein the second CRC test is performed on a second portion of the control channel associated with the first retransmission and the second retransmission, if the second CRC test passes, retrieve control information from the control channel, the control information associated with the first retransmission or the second retransmission, and decode the second retransmission using the retrieved control information.

12. The system of claim 11, wherein the one or more processors and/or circuits are further configured to concurrently buffer the received HSDPA traffic in a first storage and in a second storage.

13. The system according to claim 12, wherein the one or more processors and/or circuits are further configured to hybrid automatic retransmission request (HARQ) process the buffered HSDPA traffic in the first storage or the buffered HSDPA traffic in the second storage according to the first CRC test.

14. The system according to claim 13, wherein the one or more processors and/or circuits are further configured to store an output of the HARQ processing from the first storage or the second storage.

15. The system according to claim 14, wherein the one or more processors and/or circuits are further configured to Turbo decode stored HARQ processed HSDPA traffic from an Incremental Redundancy (IR) memory or a Continuous Packet Connectivity (CPC) IR-memory.

16. The system according to claim 14, wherein the one or more processors and/or circuits are further configured to perform HARQ processing on the buffered HSDPA traffic in the first storage or the second storage, and Turbo decoding a corresponding stored HARQ processed HSDPA traffic.

17. The system according to claim 16, wherein the one or more processors and/or circuits are further configured to Turbo decode the HARQ processed HSDPA traffic for each transport format from a set of pre-determined transport formats.

18. The system of claim 12, wherein the one or more processors and/or circuits are further configured to obtain the legacy HSDPA traffic by processing buffered HSDPA traffic of the first storage according to an HS-SCCH associated with the legacy HSDPA traffic.

19. The system of claim 11, wherein the one or more processors and/or circuits are further configured to blindly decode the initial transmission based on a set of pre-determined transport formats.

20. The system of claim 11, wherein the initial transmission is HS-SCCH less HSDPA traffic and the first retransmission is the legacy HSDPA traffic.

* * * * *

UNITED STATES PATENT AND TRADEMARK OFFICE
CERTIFICATE OF CORRECTION

| | | |
|---|---|---|
| PATENT NO. | : 9,118,442 B2 | Page 1 of 1 |
| APPLICATION NO. | : 12/577080 | |
| DATED | : August 25, 2015 | |
| INVENTOR(S) | : Chang et al. | |

It is certified that error appears in the above-identified patent and that said Letters Patent is hereby corrected as shown below:

In the Claims

Column 19, line 28 Please replace "device configured to, wherein:" with --device configured to wherein:--.

Signed and Sealed this
Nineteenth Day of January, 2016

Michelle K. Lee
*Director of the United States Patent and Trademark Office*